United States Patent [19]

Yabe et al.

[11] Patent Number: 4,635,220

[45] Date of Patent: Jan. 6, 1987

[54] BINARY CODED DECIMAL NUMBER DIVISION APPARATUS

[75] Inventors: Hideaki Yabe; Yoshio Oshima; Sako Ishikawa; Toru Ohtsuki; Masaharu Fukuta, all of Hadano, Japan

[73] Assignee: Hitachi, Ltd., Tokyo, Japan

[21] Appl. No.: 549,809

[22] Filed: Nov. 8, 1983

[30] Foreign Application Priority Data

Nov. 9, 1982 [JP] Japan ................. 57-196618

[51] Int. Cl.$^4$ ............................................. G06F 7/52
[52] U.S. Cl. ...................................................... 364/763
[58] Field of Search ................. 364/763, 761, 762, 764

[56] References Cited

U.S. PATENT DOCUMENTS

| | | | |
|---|---|---|---|
| 3,234,367 | 2/1966 | Ottaway et al. | 364/761 |
| 3,578,961 | 5/1971 | Miu | 364/763 |
| 3,610,905 | 10/1971 | Herron et al. | 364/763 |
| 3,735,107 | 5/1973 | Bolt et al. | 364/763 |
| 3,735,108 | 5/1973 | Bolt et al. | 364/763 |
| 4,466,077 | 8/1984 | Iannucci et al. | 364/763 |

FOREIGN PATENT DOCUMENTS

| | | | |
|---|---|---|---|
| 1193705 | 11/1962 | Fed. Rep. of Germany | 364/761 |
| 0140846 | 8/1983 | Japan | 364/763 |

OTHER PUBLICATIONS

Spaniol, Arithmetik in Rechenanlagen, Teubner Studienbucher, 1976, pp. 118-119.

Primary Examiner—James D. Thomas
Assistant Examiner—Dale M. Shaw
Attorney, Agent, or Firm—Antonelli, Terry & Wands

[57] ABSTRACT

A binary coded decimal number division apparatus in which a quotient represented in a binary coded decimal notation is determined on digit-by-digit basis by using a quotient prediction table and a group of multiple value registers and in which a predicted quotient read out from the quotient prediction table is used intact when the predicted quotient is correct while otherwise the predicted quotient is decremented by one, wherein the values stored in the quotient prediction table together with redundant bit are previously modified to $(0110)_2$ to $(1111)_2$ in the binary coded decimal representation. The multiple value register is selected by using three of the four bits of the modified predicted quotient, while upon determination of the quotient, the value used for modification is subtracted from the output value of the quotient prediction table to thereby derive the predicted quotient of one digit. With this arrangement, three of the four bits of the predicted quotient of one digit read out from the quotient prediction table can be used directly as the selection signal for selecting the relevant divisor multiple register.

5 Claims, 8 Drawing Figures

FIG. 6a $$\begin{cases} S_0 = a_0 \cdot a_1 \cdot a_2 \\ S_1 = a_1 \cdot \overline{a_2} + \overline{a_1} \cdot a_2 \\ S_2 = \overline{a_2} \\ S_3 = a_3 \\ S_P = (a_0 \cdot \overline{a_1} \cdot a_2) \oplus a_P \end{cases}$$

FIG. 6b

| $a_0\,a_1\,a_2\,a_3$ | $a_P$ | → | $S_0\,S_1\,S_2\,S_3$ | $S_P$ |
|---|---|---|---|---|
| 0 1 1 0 | 1 | | 0 0 0 0 | 1 |
| 0 1 1 1 | 0 | | 0 0 0 1 | 0 |
| 1 0 0 0 | 0 | | 0 0 1 0 | 0 |
| 1 0 0 1 | 1 | | 0 0 1 1 | 1 |
| 1 0 1 0 | 1 | | 0 1 0 0 | 0 |
| 1 0 1 1 | 0 | | 0 1 0 1 | 1 |
| 1 1 0 0 | 1 | | 0 1 1 0 | 1 |
| 1 1 0 1 | 0 | | 0 1 1 1 | 0 |
| 1 1 1 0 | 0 | | 1 0 0 0 | 0 |
| 1 1 1 1 | 1 | | 1 0 0 1 | 1 |

FIG. 6c

| $a_0\,a_1\,a_2\,a_3$ | $a_P$ | → | $S_0\,S_1\,S_2\,S_3$ | $S_P$ | |
|---|---|---|---|---|---|
| 0 0 0 0 | 1 | | 0 0 1 0 | 1 | ← PARITY ERROR |

BINARY CODED DECIMAL NUMBER DIVISION APPARATUS

CROSS REFERENCES OF THE RELATED APPLICATIONS

This application is related to U.S. Ser. No. 462,423 filed Jan. 31, 1983, based on Japanese Patent Application No. 57-23230 filed Feb. 16, 1982 and assigned to the present assignee.

BACKGROUND OF THE INVENTION

The present invention relates to an apparatus for division of binary coded decimal numbers and more particularly to a binary coded decimal number division apparatus which is capable of realizing optimized decimal number division effected by making reference to a quotient prediction table.

In the division of binary numbers, use is made of a quotient prediction table with a view to attaining a high-speed arithmetic operation as referred to in, for example, the above-referenced application. In the case of the division of binary coded decimal numbers, it is equally possible to adopt a process in which a quotient in binary coded decimal representation is determined on a digit-by-digit basis starting from the most significant or highest-order digit by making use of a quotient prediction table.

FIG. 1 of the accompanying drawings shows in a block diagram a binary coded decimal number division circuit in which a quotient prediction table is incorporated. This subject matter is presented by way of explanation, but is not publicly known nor prior art to this application. Referring to this figure, a dividend placed in a dividend register 1 and a divisor set in a divisor register 3 are applied to the inputs of a decimal addition/subtraction unit 8 together with a selected one of the divisor multiples stored in divisor multiple registers 7. Besides, the significant or higher-order bits of the dividend register 1 and the divisor register 3, respectively, are inputted to a quotient prediction table 4, whereby a predicted quotient is loaded in a quotient prediction register 5. The quotient determined by a quotient decision circuit 11 is loaded in a quotient register 2. The quotient prediction table 4 contains and stores therein predicted quotients each represented by one digit (consisting of four bits) of a binary coded decimal number which is determined by the combination of an input value of the dividend and an input value of the divisor, i.e. the value corresponding to the correct quotient or the value greater than the correct one by "1". It is decided that the value in question corresponds to the correct quotient if a carry is produced in actual subtraction of a multiple of the divisor from the dividend. On the other hand, if no carry is produced, it is determined that the subtraction is excessive. In the latter case, a one-fold multiple of the divisor is subsequently added.

Operation of the binary coded decimal number divide circuit shown in FIG. 1 will be described below in more detail. In precedence to the arithmetic operation, multiples (two-fold to nine-fold multiplies) of a divisor placed in the divisor register 3 are previously loaded in the divisor multiple registers 7, respectively. For determining the quotient of one binary coded decimal digit number on the basis of the value supplied from the dividend register 1 and the value available from the divisor register 3, a predicted quotient of one binary coded decimal digit number (consisting of four bits) is read out from the quotient prediction table 4 in dependence on the address which is prepared on the basis of a predetermined number of more significant bits of the dividend placed in the dividend register 1 and a predetermined number of more significant bits of the divisor placed in the divisor register 3. The predicted quotient thus determined is loaded in the quotient prediction register 5 also referred to as the predicted quotient register. Subsequently, the predicted quotient of four bits thus determined is converted into a selection signal (of three bits) through a predicted quotient conversion circuit 9 for selecting one of multiples contained in the divisor multiple registers 7 to thereby allow a multiple Y of the divisor placed in the register 7 selected by the selection signal to be inputted to the decimal addition/subtraction unit 8, wherein the multiple Y is subtracted from the dividend of value X placed in the dividend register 1. A switching gate 12 selects either one of the output of the divisor register 3 and the output of the divisor multiple register 7 and a switching gate 13 selects either the output of the register 5 or the output of a minus-1 circuit 6 in accordance with the presence or absence of a carry signal CAR outputted from the decimal addition/subtraction unit 10. When a carry signal CAR occurs in the subtraction mentioned above (i.e. "X"−"Y"≧0), the value outputted from the decimal addition/subtraction unit 8 (that is, the interim remainder) is transferred to the dividend register 1 to be stored therein. The dividend register 1 may thus be referred to as the interim remainder register as well. Simultaneously, with the aid of microprograms the content of the quotient prediction register 5 is transferred intact (i.e. as they are) to the quotient register 2 to be stored therein through the quotient decision circuit 11. After the quotient and the interim remainder have been stored in the register 2 and the register 1, respectively, the dividend register 1 and the quotient register 2 are shifted to the left by one digit of the binary coded decimal number.

On the other hand, when no carry signal occurs in the subtraction mentioned above, that is, the result of the subtraction is negative (i.e. "X"−"Y"<0), the value outputted from the decimal addition/subtraction unit 8 is once transferred to the dividend register 1 to be stored therein, and the value is again inputted to the decimal addition/subtraction unit 8 to be added with the value (one-fold multiple) of the divisor placed in the divisor register 3, the result of the addition being transferred as the interim remainder to the dividend register 1 to be newly stored therein. Simultaneously, a value which corresponds to the content of the quotient prediction register 5 decremented by "1" through the minus-one circuit 6 of the quotient decision circuit 11 is selected and transferred to the quotient register 2 to be stored therein. In this manner, in case of the excessive subtraction, the interim remainder is correctively added to a value in excess of the subtrahend (i.e. one-fold multiple of the divisor) to thereby alter concurrently the quotient digit to the correct value. After the interim remainder and the quotient have been loaded, the dividend register 1 and the quotient register 2 are shifted to the left by one digit or position of the binary coded decimal number. Even when a quotient of 1 is determined for a certain digit, the above non-carry procedures are always taken. Accordingly, in any case, the decimal addition/subtraction unit 8 is controlled to arithmetically operate on the content of the divisor multiple register 7 and the content of the dividend register 1 at first.

In this way, the operations mentioned above are repeated for a required number of times, whereby the quotient represented in the binary coded decimal notation is formed in the quotient register 2 on a digit-by-digit basis starting from the highest-order digit.

FIG. 2 is a diagram illustrating relationships among the four-bit predicted quotients determined by referring to the quotient prediction table 4, the three-bit selection signals produced by the conversion circuit 9 and the divisor multiple registers 7 as well as the multiples stored therein.

As will now be appreciated, in the case of the binary coded decimal number divide apparatus shown in FIG. 1, it is required to provide the predicted quotient conversion or translation circuit 9 for converting the predicted quotient read out from the quotient prediction table 4 into the selection signal for selecting one of the divisor multiple registers 7, because the predicted quotient corresponds to the one decimal number digit (i.e. 4 bits) of the correct quotient or the value greater than it by "1".

Since the quotient prediction table 4 for the binary coded decimal number division has to store therein the correct predicted quotients or values greater by "1", realization of the table 4 by using random access memories (RAMs) each of 4K-bit capacity will require as great a number of RAMs as 1024 in consideration of the absolute quantity of addresses each prepared by three digits of the dividend and two digits of the divisor.

In general, a lot of time is required for reading out data from a RAM as compared with a signal delay time involved by another type of logical circuit. Besides, a RAM of a greater capacity requires a correspondingly longer access time and vice versa. Consequently, when the quotient prediction table 4 is to be realized by using a RAM of a great storage capacity, the access time will be correspondingly increased, while realization of the quotient table by using a number of RAMs each of a small storage capacity connected in series will necessarily result in a correspondingly increased package area, involving a significant time delay in signal transmission. Accordingly, in either case, a great deal of time will elapse from the access to the quotient prediction table 4 before a provisional quotient is read out therefrom.

Needless to say, an additional delay is brought about because the provisional quotient thus read out from the quotient prediction table 4 has to undergo conversion effected by the conversion circuit 9 for selecting one of the divisor multiple registers 7. As a result, the decimal addition/subtraction unit 8 cannot perform a fast operation, thus prolonging the arithmetic operation time.

Furthermore, it must be pointed out in connection with the quotient prediction table 4 that in case the unused address among the successive addresses which is not designated by the combination of the more significant bits of the divisor and the divided, respectively, is merely loaded with "0s", an erroneous access to the unused address due to a fault of the address line would result in the reading-out of "0s", which can not however be discriminated from "0" bits of the predicted quotient. To eliminate this difficulty, fail-safe measures are required, such as, for example, writing of a parity error pattern obtained by inverting a parity bit at all the unused addresses of the quotient prediction table 4 so that a fault on an address line can be detected when the unused address is erroneously accessed.

SUMMARY OF THE INVENTION

Accordingly, it is an object of the present invention to provide a binary coded decimal number division apparatus which is not susceptible to the problems encountered in the apparatus such as described above and in which the predicted quotient read out from the quotient prediction table can be straightforwardly made use of as the selection signal for selecting the divisor multiple register without need for the predicted quotient conversion circuit.

In view of the above object, there is provided according to a general feature of the present invention, a binary coded decimal number division apparatus in which a quotient represented in a binary coded decimal notation is determined on a digit-by-digit basis by using a quotient prediction table and a group of multiple value registers and in which a predicted quotient read out from the quotient prediction table is used intact when the predicted quotient is correct while otherwise the predicted quotient is decremented by one, wherein the values stored in the quotient prediction table together with a redundant bit are previously modified to $(0110)_2$ to $(1111)_2$ in the binary coded decimal representation, the multiple value register being selected by using lower three of the four bits (representing one digit) of the modified predicted quotient, while upon determination of the quotient, the value used for modification is decreased by six from the output value of the quotient prediction table to thereby derive the predicted quotient of one digit. With this arrangement, three of the four bits of the predicted quotient of one digit read out from the quotient prediction table can be used directly as the selection signal for selecting the relevant divisor multiple register.

BRIEF DESCRIPTION OF THE DRAWINGS

The other objects, features and advantages of present invention will be more apparent when considering the following description taken in conjunction with the accompanying drawings, in which:

FIGS. 6a to 6c are diagrams for illustrating the operation of a minus-6 circuit shown in FIG. 3.

DESCRIPTION OF THE PREFERRED EMBODIMENTS

Figure 3:
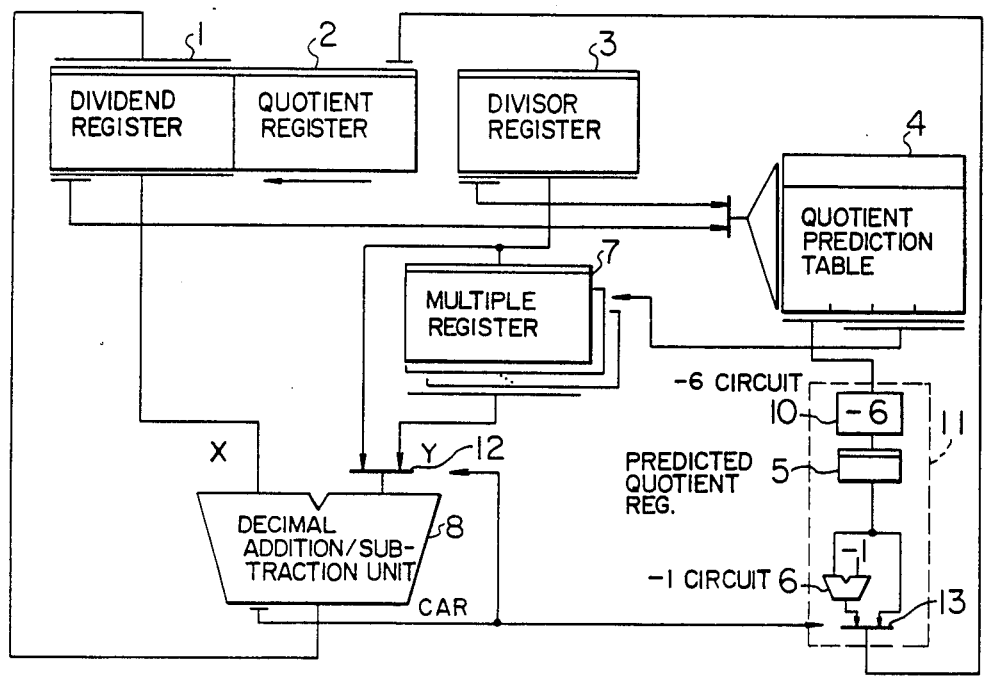
FIG. 3 is a block diagram showing an arrangement of a binary coded decimal number division apparatus according to an embodiment of the invention.

FIG. 3 shows in a block diagram an arrangement of a binary coded decimal number division apparatus according to an embodiment of the present invention. Referring to this figure, the binary coded decimal number apparatus according to the invention is essentially identical with the apparatus shown in FIG. 1, so far as such arrangement is concerned in which multiple values (inclusive of two-fold to nine-fold multiples) are previously stored in the divisor multiple registers 7, respectively, and the address of the quotient prediction table 4 is prepared on the basis of predetermined numbers of more significant bits of the dividend and divisor placed in the register 1 and the register 3, respectively. In the case of the binary coded decimal number division apparatus shown in FIG. 1, binary coded decimal numbers of $(0000)_2$ to $(1001)_2$ are stored in the quotient prediction table 4 as the predicted quotients, each being of one digit, respectively. In contrast, according to the teaching of the present invention, the binary coded decimal numbers of $(0110)_2$ to $(1111)_2$ obtained by adding $6 = (0110)_2$ to the binary coded decimal numbers $(0000)_2$ to $(1001)_2$, respectively, are stored in the quotient prediction table 4. Consequently, by preparing the addresses of the quotient prediction table 4 on the basis of the predetermined number of the more significant bits of the dividend and the divisor placed in the register 1 and the register 3, respectively, the valve read out from the quotient prediction table corresponds to the value of the predicted quotient which has been modified through addition of six (+6). Hereinafter, this modified value is referred to as the predicted quotient.

Among the four bits defining the predicted quotient read out from the quotient prediction table 4, the three lower significant bits are directly used as the selection signal for selecting one of the multiple registers 7 and hence the multiple placed therein. This procedure will hereinafter be described in detail. At the same time, all four bits of the read out predicted quotient of one digit are inputted to a quotient decision circuit 11, and a factor of 6 is subtracted from the input predicted quotient through the minus-6 circuit 10, the result of subtraction being stored in the predicted quotient register 5. On the other hand, the divisor multiple stored in the multiple register 7 selected by the selection signal is inputted to a decimal addition/subtraction unit 8 and is subtracted from the value of the dividend stored in the dividend register 1. Depending on whether the result of the subtraction is positive or negative, the interim remainder is finally transferred to the dividend register 1 to be stored therein, while the quotient determined by the quotient decision circuit 11 is transferred to the quotient register 2 to be stored therein. The above transfer procedures are the same as those adopted in the apparatus shown in FIG. 1.

Figure 4:
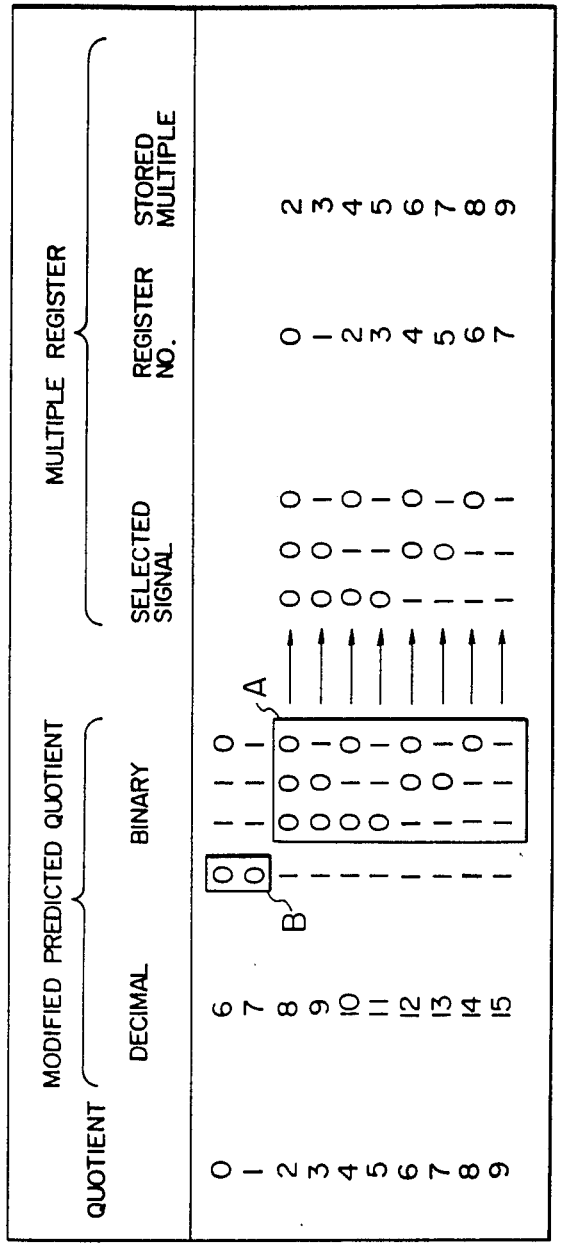
FIG. 4 is a diagram for illustrating the preparation of a selection signal for selecting one of multiple registers shown in FIG. 3.

Next, referring to FIG. 4, description will be made in what manner the bit patterns to be stored in the quotient prediction table are modified and how the modified bit patterns are made use of according to the teaching of the invention.

The predicted quotients "0" to "9" to be stored in the quotient prediction table 4 (shown at the leftmost column in FIG. 4) are modified to "6" to "15" by adding "6" to "0" to "9", respectively, according to the teaching of the invention. Among the binary or bit representations corresponding to the predicted quotients modified by addition of "6", respectively, the three lower significant bits of binary representations of the quotients "2" to "9", respectively, are indicated within a rectangular block A. As will be seen in FIG. 4, the bit patterns $(000)_2$ to $(111)_2$ corresponding to the quotients "2" to "9", respectively, and as shown within the block A coincide with the selection signals for selecting the multiple registers 7 which store therein the multiple values "2" to "9", respectively. This means that the bit pattern within the block A can be straightforwardly used as the selection signals for selecting one of the multiple registers 7 without resorting to the use of the bit conversion circuit 9 which has been required in the division apparatus of FIG. 1.

In this connection, it is noted that the three lower significant bits of the quotients "0" and "1" are, respectively, $(110)_2$ and $(111)_2$ which are equal to the three lower significant bits of the quotients "8" and "9", respectively. Considering, however, the most significant bits of the predicted quotients modified by "+6", only those corresponding to the quotients "0" and "1" are "0s", as indicated within a block B in FIG. 4. Accordingly, it can be determined with reference to the most significant bit whether the output of the multiple registers 7 (storing the multiple values "2" to "9", respectively,) or the output of the divisor register 3 (storing the one-fold multiple) is to be selected as the input Y for the decimal addition/subtraction unit 8.

Next, referring to FIGS. 5 and 6, description will be made of error detection due to a fault on the address lines or the like in the binary coded decimal number division apparatus according to the invention.

Figure 5:
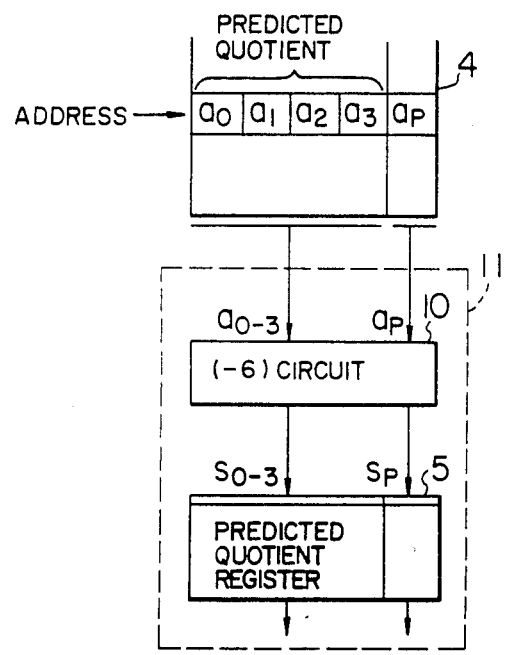
FIG. 5 is a schematic circuit diagram illustrating the operation of a quotient decision circuit shown in FIG. 3.

As is seen in FIG. 5, each of the addresses of the quotient prediction table contains an odd parity bit $a_p$ for the stored predicted quotient of four bits $a_0$ to $a_3$. Accordingly, five bits inclusive of the parity bit $a_p$ in total are inputted to the quotient decision circuit 11, resulting in the quotient bits $S_0$ to $S_3$ and the parity bit $S_p$ being placed in the predicted quotient register 5 by way of the minus-6 circuit 10.

FIGS. 6a to 6c illustrate logical operations of the minus-6 circuit 10 optimized for the case where bit $S_0$, . . . , $S_3$ are, respectively, $(0000)_2, \ldots, (1001)_2$, which is meaningful for the quotient bits $S_0, \ldots, S_3$ to represent one binary coded decimal number digit. More specifically, FIG. 6a shows Boolean expressions for illustrating the operation of the minus-6 circuit 10, while FIG. 6b illustrates more specifically the results of the operation effected by the circuit 10 in accordance with the Boolean expressions.

Since no predicted quotient is present at the unused address of the quotient prediction table 4, the corresponding bits "$a_0, a_1, a_2, a_3, a_p$" are set to "00001". FIG. 6c illustrates the bit pattern of $S_0, \ldots, S_3, S_p$ outputted by the minus-6 circuit 10 in response to the input of "00001", which bit pattern represents a parity error. In this way, when the unused address is erroneously looked up due to the fault of the addressing line or the like, this can be detected as, a parity error by the quotient decision circuit 11.

As will be appreciated from the foregoing description, the illustrated embodiment of the invention allows the three lower significant bits of the predicted quotient of one decimal digit read out from the quotient prediction table to be straightforwardly used as the selection signal for selecting the multiple register without requiring the processing by the bit conversion circuit (9, FIG. 1), whereby the multiple of the divisor can be read out at a high speed.

Figures 1, 2:
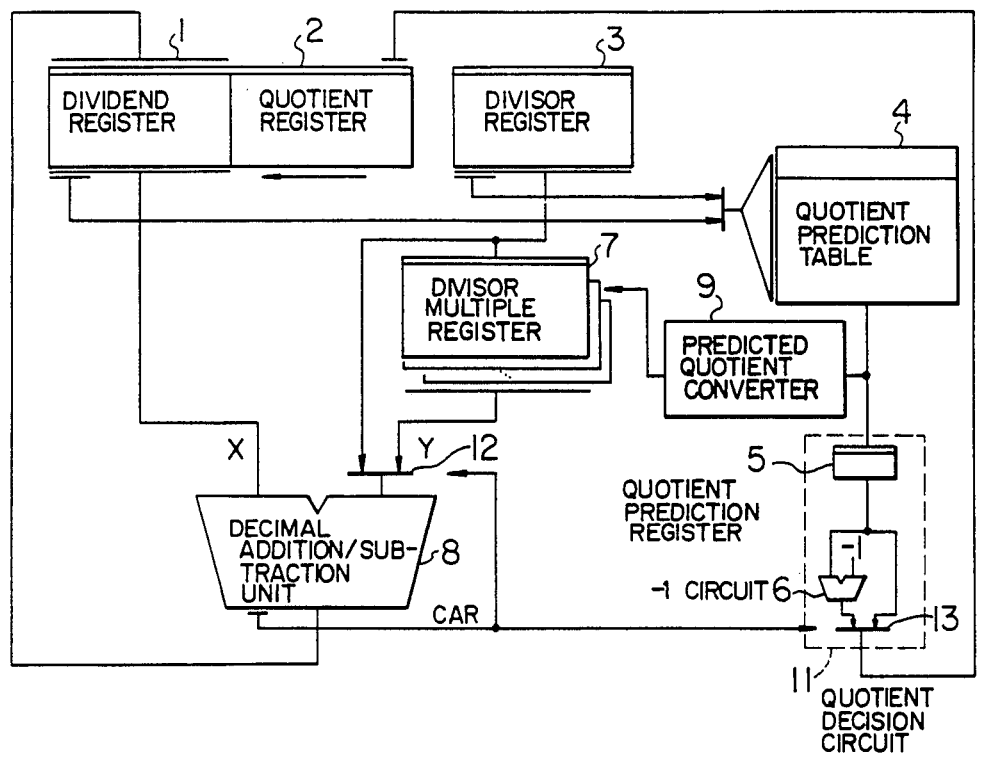
FIG. 1 is a block diagram showing an arrangement of a binary coded decimal number division apparatus.
FIG. 2 is a diagram for illustrating preparation of a selection signal for selecting one of multiple registers shown in FIG. 1.

In the binary coded decimal number division apparatus of FIG. 1, the predicted quotients are stored, as they are, in the quotient prediction table. Accordingly, it is impractical to set the bits $a_0, a_1, a_2, a_3$ and $a_p$ of the unused addresses to the bit pattern $(00001)_2$, because then the predicted quotient of digit "0" will be erroneously identified. Under the circumstance, particular bit patterns representing the parity error have to be stored at all the unused addresses. In contrast, in the case of the illustrated embodiment of the invention, the bits of the unused addresses of the quotient prediction table may be simply set to the aforementioned bit pattern (00001)₂, to thereby allow the error detection to be effected in a simplified manner when the unused address is erroneously accessed due to the fault of the addressing line or the like.

It will now be understood that the invention has provided a binary coded decimal number division apparatus in which the data to be stored in the quotient prediction table is previously modified so that the desired multiple register can be directly selected, whereby as compared to the case of not using the modification of the data, the decimal addition subtraction unit 8 can start an arithmetic operation earlier, consequently assuring a high-speed operation.

Further, in contrast to the apparatus in which particular error patterns have to be stored at the unused addresses of the quotient prediction table for permitting the error detection upon accessing the unused addresses, storage of such particular error patterns is rendered unnecessary according to the present embodiment, to another advantage. Besides, the error detection can be effected through the conventional parity check without requiring provision of any particular fault detecting circuit.

What is claimed is:

1. A binary coded decimal number division apparatus for determining a quotient on a digit-by-digit basis from a dividend and a divisor represented by binary coded decimal notation by referring to a quotient prediction table comprising:
   (a) dividend input means for storing a dividend;
   (b) divisor input means for storing a divisor;
   (c) quotient output means for storing a quotient developed as a result of processing the dividend and divisor;
   (d) register means including a plurality of divisor multiple registers connected to said divisor input means for holding divisor multiples, each multiple register being individually addressable and holding a value equal to said divisor multiplied by a different single digit decimal value;
   (e) arithmetic means having one input connected to the output of said dividend input means and another input selectively connected to said divisor input means or said register means and having an output connected to the input of said dividend input means;
   (f) storage means connected to said dividend input means and said divisor input means for storing a table of modified quotient prediction values which is accessed by a pair of addresses represented by predetermined numbers of the more significant bits of said dividend and said divisor, respectively, to read out a modified predicted quotient which has a digital value corresponding to a predetermined number added to a predicted quotient which forms a correct quotient or a value greater than the correct quotient by one, said predetermined number being selected such that one part of said read out modified predicted quotient directly specifies the address of one of said multiple registers, and including means for directly applying said one part of said modified predicted quotient to said register means to select one of said multiple registers;
   (g) quotient decision means connected to receive said modified predicted quotient read out from said storage means and responsive to said arithmetic means for determining a true quotient and for sending said true quotient to said quotient output means, including reconversion means connected to said storage means for subtracting said predetermined number from the modified predicted quotient read out from said storage means to produce said predicted quotient and means responsive to said arithmetic means for decrementing said predicted quotient or applying said predicted quotient directly to said quotient output means as a true quotient.

2. The apparatus according to claim 1, further including selection means connected to said divisor input means and said register means for applying the output of said divisor input means or the output of a selected one of said multiple registers to one input of said arithmetic means in response to another part of said modified predicted quotient read out of said storage means.

3. The apparatus according to claim 2, wherein each modified predicted quotient stored in said storage means includes four bits, said one part of said modified predicted quotient is formed by the three least significant bits thereof and said other part is formed by the most significant bit thereof.

4. The apparatus according to claim 1, wherein each modified predicted quotient stored in said storage means includes four bits, and said predetermined number is "0110" in binary notation.

5. The apparatus according to claim 1, wherein each modified predicted quotient stored in said storage means includes four bits and has a fifth parity bit appended thereto, said table in said storage means having unused storage locations in which there is stored the bits "00001".

* * * * *